United States Patent
Jang et al.

(10) Patent No.: US 8,537,900 B2
(45) Date of Patent: Sep. 17, 2013

(54) AUTOMATIC TEMPORAL LAYER BIT ALLOCATION

(75) Inventors: Wonkap Jang, Edgewater, NJ (US); Michael Horowitz, Austin, TX (US)

(73) Assignee: Vidyo, Inc., Dallas, TX (US)

( * ) Notice: Subject to any disclaimer, the term of this patent is extended or adjusted under 35 U.S.C. 154(b) by 295 days.

(21) Appl. No.: 12/897,365

(22) Filed: Oct. 4, 2010

(65) Prior Publication Data

US 2012/0082237 A1    Apr. 5, 2012

(51) Int. Cl.
*H04N 7/12* (2006.01)
*H04N 11/02* (2006.01)
*H04N 11/04* (2006.01)

(52) U.S. Cl.
USPC ................. 375/240.24; 375/240.26

(58) Field of Classification Search
None
See application file for complete search history.

(56) References Cited

U.S. PATENT DOCUMENTS

| | | | |
|---|---|---|---|
| 5,731,835 A | 3/1998 | Kuchibholta | |
| 2002/0168007 A1* | 11/2002 | Lee | 375/240.03 |
| 2003/0016752 A1* | 1/2003 | Dolbear et al. | 375/240.16 |
| 2003/0058931 A1* | 3/2003 | Zhang et al. | 375/240.01 |
| 2003/0195977 A1* | 10/2003 | Liu et al. | 709/231 |
| 2003/0233464 A1* | 12/2003 | Walpole et al. | 709/231 |
| 2004/0042548 A1* | 3/2004 | Yu et al. | 375/240.03 |
| 2005/0175085 A1* | 8/2005 | Bergen et al. | 375/240.01 |
| 2005/0254578 A1* | 11/2005 | Muthukrinan et al. | 375/240.03 |
| 2006/0250520 A1* | 11/2006 | Han et al. | 348/398.1 |
| 2006/0252500 A1 | 11/2006 | Han et al. | |

OTHER PUBLICATIONS

International Search Report and Written Opinion for PCT/US2010/051278, dated Nov. 29, 2010.*

* cited by examiner

*Primary Examiner* — Joseph Ustaris
*Assistant Examiner* — Ellyar Y Barazesh
(74) *Attorney, Agent, or Firm* — Baker Botts LLP

(57) ABSTRACT

Disclosed herein are techniques and computer readable media containing instructions arranged to determine a bit allocation for a temporal base layer and at least one temporal enhancement layer. The techniques are enhanced to yield improved reproduced quality for the case where both a temporal base layer and at least one temporal enhancement layer is being used. An exemplary method for determining a bit allocation to one base layer includes initializing a bit allocation between the base layer and the at least one enhancement layer, determining a quality difference between the base layer and the at least one enhancement layer, expressed, for example, in the Quantizer Parameter of the last picture of each layer within a GOP, and determining a new bit allocation between the base layer and the at least one enhancement layer based on the quality difference and at least one constant factor.

28 Claims, 4 Drawing Sheets

AUTOMATIC TEMPORAL LAYER BIT ALLOCATION

FIELD

The invention relates to video compression. More specifically, the invention relates to techniques for bit allocation for the use in encoders using a temporal base layer and at least one temporal enhancement layer.

BACKGROUND

Subject matter related to the present application can be found in co-pending U.S. provisional patent application Ser. No. 61/389,499, filed concurrently herewith on Oct. 4, 2010, and entitled "Delay Aware Rate Control in the Context of Hierarchical P Picture Coding", which is hereby incorporated by reference herein in its entirety.

In video compression, rate control refers to technologies that tune bit stream parameters, most commonly the Quantization Parameter (QP), according to a known bit budget. Rate control schemes are known that adjust the QP (and/or other bit stream parameters) to units, for example, individual macroblocks, slices, individual pictures, or group of pictures (GOPs). Many papers have been published on rate control concepts optimized to address the tuning of the QP in one or more of the aforementioned units.

In order to successfully apply a rate control mechanism, the mechanism needs to know the target number of bits—a bit allocation—for the unit it is designed to operate on (e.g., the macroblock, slice or picture). Spatial enhancement layers, Signal-to-Noise Ratio (SNR) enhancement layers, or enhancement layers of other types can also be present in the bitstream, and, in some configurations, a spatial/SNR/other type enhancement layer can be used as a temporal base layer. Therefore, pictures in a temporal base layer can refer to pictures in spatial, SNR, or other types of non-temporal base or enhancement layer pictures for prediction. A layered bitstream can also have one specific base layer that is distinguished by its pictures having a prediction relationship only to other pictures in this layer, and not to any pictures in any of the enhancement layers. This layer is, henceforth, referred to as the "fundamental base layer". Further, the temporal base layer is henceforth simply referred to as the "base layer".

Temporal scalability has been known for some time—at least since 1992—and relates to the use of one or more temporal enhancement layers that enhance the frame rate, after decoding, of a base layer.

FIG. 1 depicts a prior art example. Pictures (102) and (103) are part of the base layer (101), denoted as TL0. The base layer (101) is independently decodable and requires that all the coded pictures of the base layer have dependencies only to each other (be it through forward, backward, bi- or multi-picture prediction) (104), (105), and not to pictures in the enhancement layers. With continuing reference to FIG. 1, the frame rate of the base layer is 7.5 Hz; therefore, the interval between two adjacent pictures of TL0 is approximately 133 ms. A first temporal enhancement layer (106), denoted as TL2, contains pictures (107) and (108). These pictures may be predicted from the base layer pictures (109), (110), as well as from other pictures of TL2 (111). Therefore, to successfully decode TL2, TL0 and TL2 pictures need to be available. As the TL2 pictures are sampled approximately 66 ms later than the pictures of TL0, the frame rate after decoding TL0 and TL2 in combination is 15 Hz. Decoding TL0 and TL2 in combination results in a visually more pleasing experience due to the higher frame rate, but also requires encoding, transmission, and decoding of both TL0 and TL2, requiring more computational and network bandwidth resources. A second temporal enhancement layer, TL3 (112), includes pictures (113), (114), (115), and (116). Pictures of the second temporal enhancement layer may be dependent on both TL0 (101) and TL2 (106) as well as other, pictures of TLH3, and, therefore, both TL0 and TL2 pictures may be required to successfully decode TL3. For clarity, the TL3 dependency relationship is not shown in FIG. 1. The frame rate, after decoding, of TL0, TL2, and TL3 is 30 Hz, with a picture interval of approximately 33 ms.

In many modern video compression standards, the GOP concept is similar, but often, the definition of an anchor picture is somewhat softened. Still referring to FIG. 1, a GOP refers to a first anchor picture and all pictures in temporal order up to, but excluding, the next anchor picture. In this disclosure, an anchor picture is defined as any picture in TL0 (101); in other words, any base layer picture. One GOP includes pictures (102) belonging to TL0 and serving as the first anchor picture, pictures (107) belonging to TL2, and pictures (113), (114), both belonging to TL3.

Temporal scalability can be practiced, using ITU-T Recommendation H.264 baseline profile (among many other profiles including Annex G). ITU-T Recommendation H.264 is informally known as Advanced Video Coding (AVC), and its scalable extension (Annex G) is informally known as Scalable Video Coding (SVC). Both are available in the same standards document known to those skilled in the art, which is available, e.g., from http://www.itu.int/rec/T-REC-H.264-200903-I or from the International Telecommunication Union, Place des Nations, 1211 Geneva 20, Switzerland. Many other standardized or non-standardized forms of temporal scalability are also known.

Many publications related to the bit allocation to individual (temporal scalable or other enhancement) layers by a layered encoder and in a layered bitstream stop short of disclosing techniques to determine the bit allocation, often by claiming that the rate is determined by external factors, such as available network bandwidth.

Common, for example, are explanations along the following exemplary lines. The base layer, e.g., TL0, can be optimized for consumption by a mobile device with an access link speed of 64 kbit/s. A first temporal enhancement layer, e.g., TL2, can be optimized for the user over two B-channel ISDN, with a bandwidth of 128 kbit/s. As TL0 is already requiring 64 kbit/s, TL2 has a budget of 128 kbit/s−64 kbit/s=64 kbit/s. A second temporal enhancement layer, e.g., TL3, can be optimized for a fractional T1 connection with 384 kbit/s total connectivity, resulting in 256 kbit/s for TL3 (following the above rationale).

The concept of a Group of Pictures, GOP, was introduced before 1992. In the MPEG standards arena, a GOP refers to an anchor picture and all the pictures up to the next anchor picture Anchor pictures were traditionally intra coded pictures, also known as I pictures. In most modern standards, the GOP concept is kept, but, often, the definition of an anchor picture is somewhat softened. In this disclosure, a GOP refers to a first anchor picture and all pictures in temporal order up to the next anchor picture. In this disclosure, an anchor picture is defined as any picture in TL0; in other words, any base layer picture. Still referring to FIG. 1, one GOP consists of pictures (102) belonging to TL0 and serving as anchor picture, (107) belonging to TL2, and (113), (114), both belonging to TL3.

Implementing a video encoder, regardless of whether it uses a non-scalable or scalable approach, may be realized, for example, using a software implementation on a sufficiently powerful general purpose processor, dedicated hardware circuitry, a Digital Signal Processor (DSP), or any combination thereof.

SUMMARY

Disclosed herein are techniques and computer readable media containing instructions arranged to determine a bit allocation for a temporal base layer and at least one temporal enhancement layer. The invention allows determining the bit allocation in such a way that the spatiotemporal experience, when using all aforementioned layers, is optimized. The invention can take into account upper and lower boundaries for the bit allocation for each layer.

An exemplary method for determining a bit allocation to a temporal base layer and at least one temporal enhancement layer includes initializing a bit allocation to the temporal base layer and the at least one temporal enhancement layer, determining a quality difference between the base layer and the at least one enhancement layer, expressed, for example, in the Quantizer Parameter of the last picture of each layer within a GOP, and determining a new bit allocation between the base layer and the at least one enhancement layer based on the quality difference and at least one constant factor.

An initial bit allocation can be selected such that the bit allocation for each picture of a GOP in, for example, temporal enhancement layers TL0, TL2, TL3, respectively, is set to, for example, 6:2:1 multiplied by a constant factor for the GOP. This initial allocation is suited for relatively low motion input signals (having good correlation between different pictures, as commonly found in video conferencing applications). However, the present invention envisions other applications which may require a different initial bit allocation setup. As there are twice as many coded pictures in TL3 (112) than in TL0 (101) and TL2 (106), this results in a bit allocation of 60% of the bits to pictures in the GOP to TL0 (101), 20% to TL2 (102), and 20% to TL3 (112). The importance of the initial setup should not be overestimated, as the mechanisms discussed below adapts to different content characteristics.

In the same or another embodiment, the bit allocation is determined at GOP boundaries; that is, once for all pictures of a GOP, at a time after the last picture of the previous GOP is coded and before the first picture of the following GOP is coded.

In the same or another embodiment, the bit allocation is determined not between GOP boundaries but between the boundary of two pictures.

In the same or another embodiment, the bit allocation is determined by a mechanism taking into account the bit allocation of the previous pictures of at least one of TL0 (101), TL2 (106), TL3 (112), and constant, possibly experimentally obtained, factors, as discussed later in detail.

In the same or another embodiment, the bit allocation involves minimum and/or maximum thresholds for the bit allocation for at least one layer.

In the same or another embodiment, the base layer is a spatial, or SNR, or other non-temporal enhancement layer.

DETAILED DESCRIPTION

The present invention provides techniques to determine a bit allocation for a temporal base layer and at least one temporal enhancement layer. The invention allows determining the bit allocation in such a way that the spatiotemporal experience, when using all aforementioned layers, is greatly enhanced.

Figure 2:
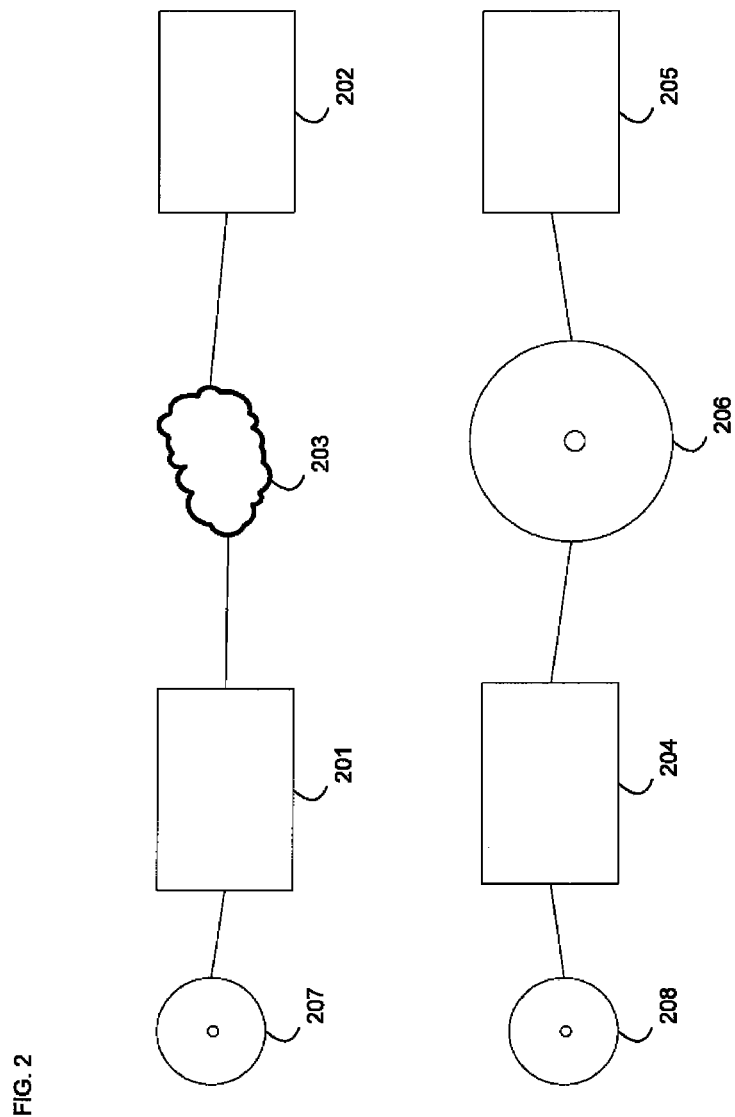
FIG. 2 is a block diagram showing an exemplary digital video transmission system and an exemplary digital video storage system in accordance with an embodiment of the present invention.

FIG. 2 depicts an exemplary digital video transmission system that includes an encoder (201), at least one decoder (202), and a mechanism (203) to transmit the digital, coded, video data, e.g., a network cloud. The encoder (201) translates an uncompressed video signal from, for example, a camera or other video source (not depicted), can preferably be encoding bit streams according to H.264/SVC, and can be hardware or software based. The decoder(s) (202) translates an incoming bitstream conformant to the same video compression standard as the encoder (preferably H.264/SVC) into an uncompressed video signal, that may be used for display, storage, or other purposes (not depicted). The decoder (202) can be hardware or software based. The transmission mechanism (203) can be an implementation of a network protocol suite such as IP/UDP/RTP on both encoding and decoding side, a network interface on both sides, and a connecting network infrastructure such as the Internet (all not depicted). The present invention provides that the decoder (s) (202) can be located in the same or different locations, owned by the same or different entities, operating at the same or different times, etc. Similarly, an exemplary digital video storage system also includes an encoder (204), at least one decoder (205) (not necessarily in the same location, owned by the same entity, operating at the same time, etc.), and a storage medium (206) (e.g., a DVD).

The present invention relates to the technology operating in the encoder (201), (204) of a digital video transmission, digital video storage, or similar system. The other elements (202), (203), (205), (206) operate in a commonly understood manner and do not require modification to be compatible with the encoders (201), (204) operating according to the invention.

An exemplary digital video encoder (henceforth "encoder") applies a compression mechanism to the uncompressed input video stream. The uncompressed input video stream typically consists of digitized pixels at a certain spatiotemporal resolution. While the present invention can be practiced with both variable spatial resolutions and variable input frame rates, for the sake of clarity, henceforth a fixed spatial resolution and a fixed frame rate are assumed and discussed. The output of an encoder is denoted as a "bitstream", but the present invention envisions that the bitstream can be put, as a whole or in fragmented form, into a surrounding higher-level format, such as a tile format or a packet format, for storage or transmission.

The practical implementation of an encoder depends on many factors, for example, cost, application type, market volume, power budget, or form factor. Known encoder implementations include full or partial silicon implementations (which can be broken into several modules), implementations running on DSPs, implementations running on general purpose processors, or a combination of any of those. Whenever a programmable device is involved, part or all of the encoder can be implemented in general purpose CPU, DSP, FPGA, etc. software using computer-readable instructions. The software can be encoded using any suitable instruction sets. The software instructions can be executed on various types of computers using the aforementioned general purpose processors, DSPs, FPGAs, etc. The software can be distributed on a computer readable media (207), (208). The present invention does not require or preclude any of the aforementioned implementation technologies.

Figure 1:
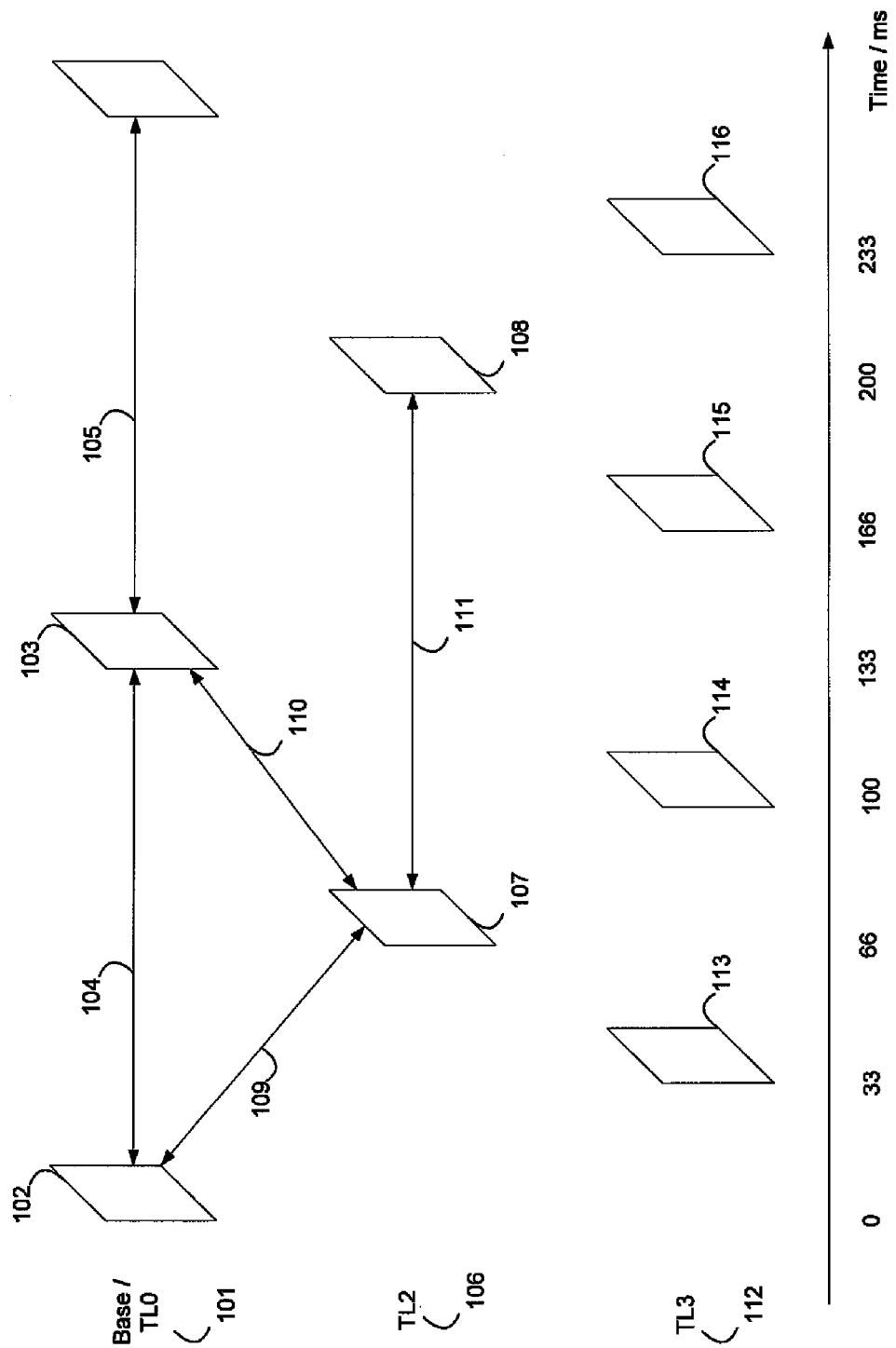
FIG. 1 is an exemplary arrangement of pictures into three layers in accordance with the prior art.

The present invention utilizes a layered encoder that is capable of creating at least a base layer and one temporal enhancement layer. For clarity, the invention is described using a base layer TL0 and two temporal enhancement layers TL2 and TL3, with the prediction relationship as depicted in FIG. 1 and described above. However, as a person skilled in the art can readily identify, other layering structures can be utilized. Adaptation to more or fewer enhancement layers may require adjustment of one or more of the constant factors described below. Spatial, SNR, or other non-temporal scalability layers can be used as temporal base layers as long as there is at least one temporal enhancement layer associated with the spatial/SNR enhancement layer that acts as the temporal base layer.

Figure 3:
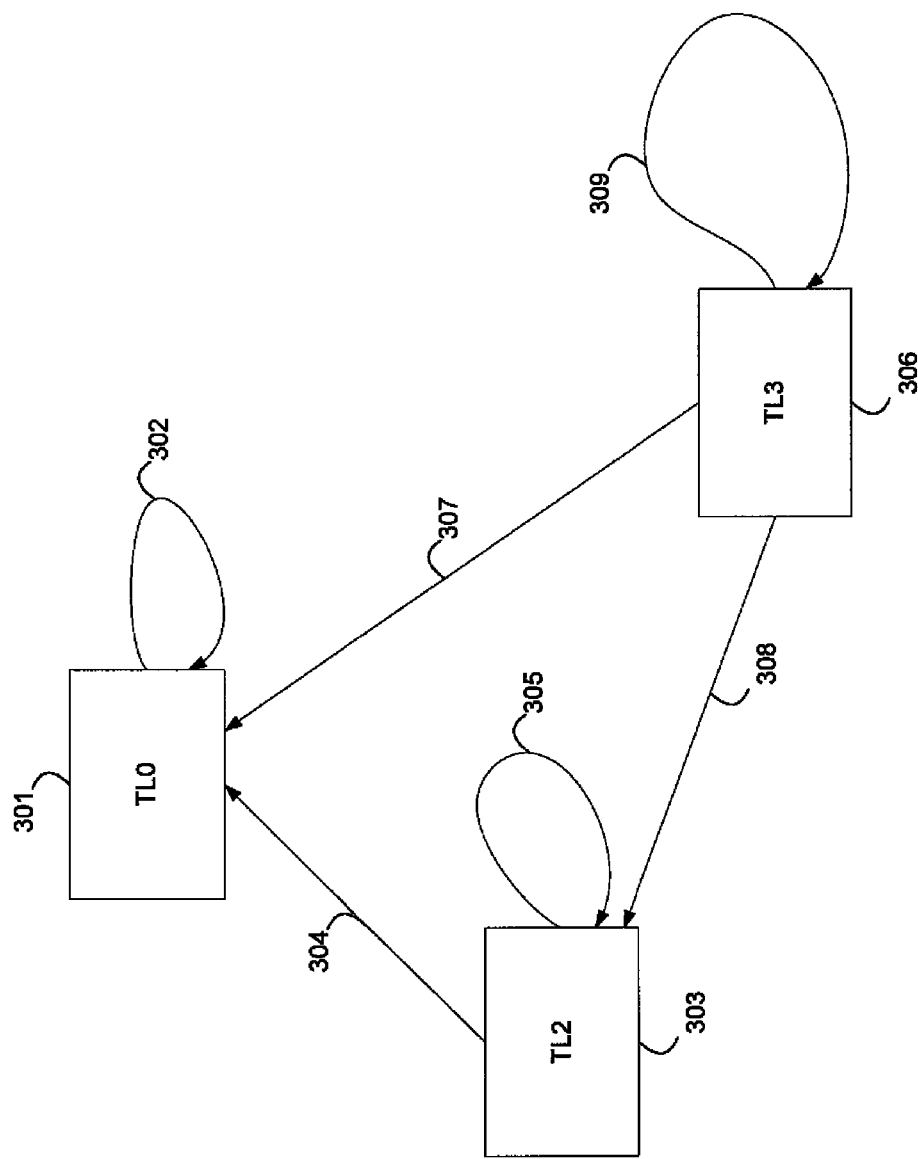
FIG. 3 depicts an exemplary layering structure in accordance with an embodiment of the present invention.

The term layered encoder refers herein to an encoder that can produce a bitstream constructed of more than one layer. The dependencies of layers in a layered bitstream stand in a given relationship, often depicted in the form of a directed graph. Of relevance for the present invention are layering dependencies such as the exemplary layering dependency depicted in FIG. 3. In this example, base layer TL0 (301) has no dependency on any of the other depicted layers (though it can have dependencies on spatial/SNR/other types of non-temporal base or enhancement layers), but pictures in TL0 (301) can have dependencies (302) on other pictures in TL0 (301). Pictures in temporal enhancement layer TL2 (303) can have dependencies (304) on pictures in the base layer TL0 (301) and/or dependencies (305) on other pictures in TL2 (303). Finally, pictures in temporal enhancement layer TL3 (306) can have dependencies (307) on pictures in TL0 (301), dependencies (308) on pictures in TL2 (303) and/or dependencies (309) on other pictures in TL3 (306). An exemplary association of sampled pictures to the layers has already been depicted in FIG. 1, and described above.

In many systems, the bit allocation per layer is driven by requirements stemming from external sources, as already discussed. The present invention contemplates a slightly different environment. Specifically, one assumption of that environment has been. an Internet Protocol (IP) based delivery system with typically sufficient bandwidth to transport all created layers. The dropping of layers by network elements can, occur in situations such as degrading or insufficient bandwidth or insufficient computational resources at the decoder, but those conditions are not the preferred operation conditions of the overall system. Accordingly, the system should be improved by making the optimistic assumption that, in most cases, all layers are both being received and processed by the decoder. Therefore, a rate allocation is required that is not predominantly driven by the requirements of a heterogeneous receiver population (with known, or predeterminable typical connectivity, such as a cell phone, two B-channel ISDN, and fractional T1), but instead by the desire to achieve the best picture quality in case all layers are received and decoded—while still maintaining basic quality in those cases where layers need to be dropped.

The above mentioned requirements result in a different design for allocation across temporal enhancement layers from any other such system of which we are aware. This design is described below in more detail.

The exemplary system in FIG. 2 is described using the already discussed three-layer structure of TL0, TL2, and TL3. However, the present invention envisions that more or fewer temporal enhancement layers can be used as well, with an adaptation of the constant factors referred to below.

A purpose of the present invention is to allocate bits within a given overall bit budget, and is independent from mechanisms that determine this overall bit budget. The overall bit budget is generally not directly used by the present invention, which concerns itself only primarily with the relative allocation between the different layers. The overall bit budget can be constant over a long period of time, and can be determined by factors such as the connectivity of both sending and receiving end, or it can be variable over shorter or longer time intervals—dependent or independent of the GOP structure—by factors such as network congestion control, user preferences, or changes in connectivity (e.g., changes in signal strength in a wireless transmission system). The overall bit rate budget becomes relevant when a rate control, that can operate for each layer independently, takes into account the overall bit budget in conjunction with the relative allocation between layers, as determined by the present invention.

Figure 4:
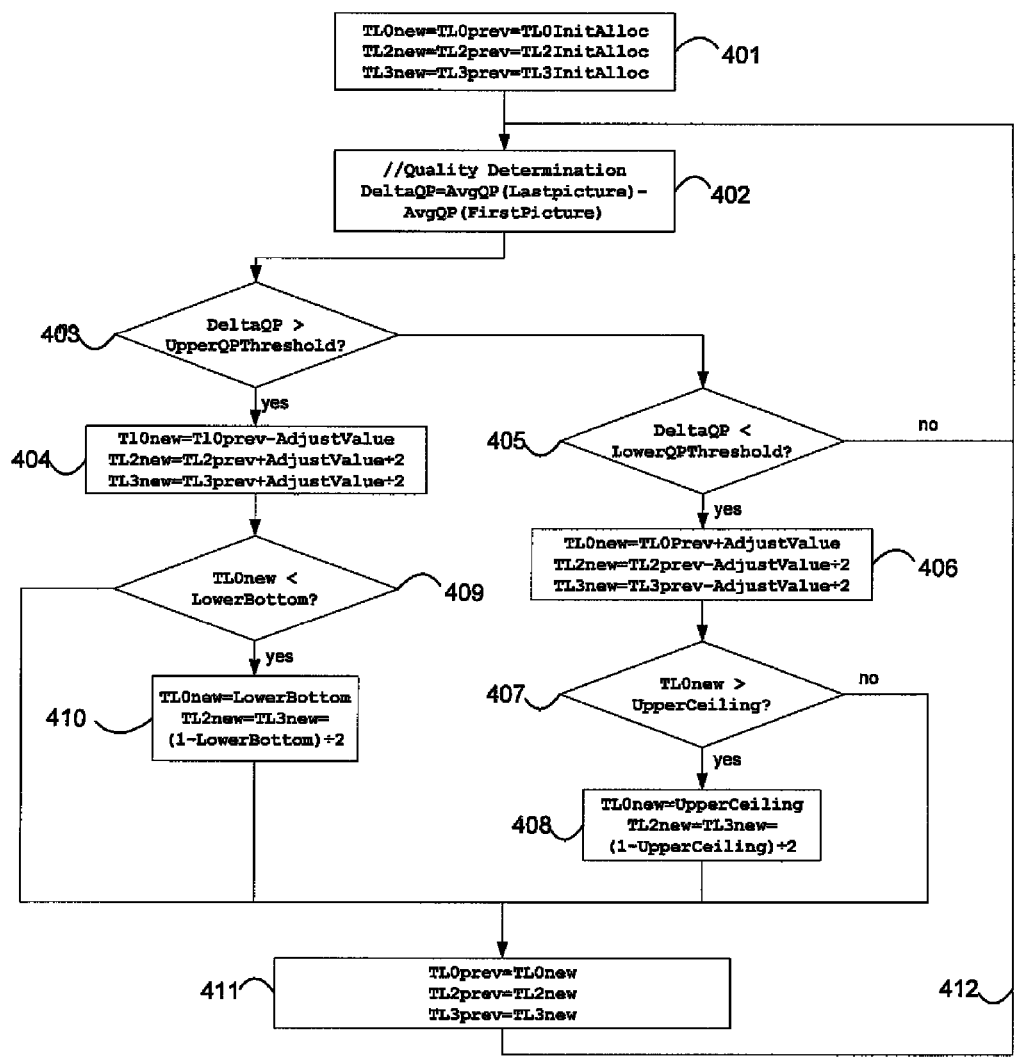
FIG. 4 is a flowchart of an exemplary allocation mechanism in accordance with an embodiment of the present invention.

FIG. 4 depicts a flow diagram of an exemplary bit allocation mechanism according to one embodiment of the invention, including pseudo-code for the most relevant flowchart elements. The bit allocation process involves the variables TLxnew, where x is one of 0, 2, or 3, and which is the number of bits allocated to the corresponding layer in the current iteration of the algorithm. Similarly, TLxprevious, where x is one of 0, 2, or 3, is the number of bits that were allocated in the previous iteration of the algorithm.

The mechanism is initialized by setting (401) the bit allocation as follows. TL0 new is assigned a value TL0 InitialAllocation, TL2 new is assigned a value TL2 InitialAllocation, and TL3 new is assigned a value TL3 InitialAllocation.

In one embodiment of the invention, one GOP, referring to FIG. 1, consists of one picture (102) belonging to TL0 and serving as the first anchor picture, one picture (107) belonging to TL2, and two pictures (113, 114) both belonging to TL3. The initial allocations are set as TL0 InitialAllocation=0.6, TL2 InitialAllocation=0.2, and TL3 InitialAllocation=0.2, representing an initial allocation of 60% of all available bits to the (single) picture in TL0 in the GOP, 20% of all available bits to the (single) picture in TL2 in the GOP. Since in the exemplary GOP there are two pictures belonging to TL3, this results in an initial allocation of 10% of all available bits to each picture of TL3. The aforementioned allocation adds up to 1.0, representing 100% of all bits available for allocation. The TLxInitialAllocation values have been determined experimentally. They may not be overly important since the mechanism can be capable of self-tuning.

The following are repeated for each GOP, after the coding of the final picture of the previous GOP and before the first picture of the next GOP.

Next, referring back to FIG. 1, a quality difference between the quality of the first picture of the GOP, which is the TL0 picture (102), and the last picture of the GOP, which is the second picture in TL3 (114), is determined. There are many options for this determination. Classic measurements of quality determination include, for example, the calculation of Signal-to-Noise Ratio (SNR), Peak Signal-to-Noise Ratio (PSNR), Sum of Absolute Difference (SAD), and Sum of Square Errors (SSE) (all calculated between spatially corresponding pixels of the uncoded picture and the reconstructed picture after encoding and decoding). The quality can also be derived indirectly, through the use of coding or bit stream parameters that can be calculated by mechanisms such as the rate control (which, in turn, used the previous allocation as its input), and which are indicative of the quality of a coded picture. As discussed later, the average Quantizer Parameter (QP) provides for a good indication of the quality. The quality can also be determined by bitstream properties that are not naturally considered quality indicators, but may still have a close relationship of the quality of a reproduced picture after transport and reconstruction. In error prone environments, for example, a large number of Intra coded macroblocks often leads to better reproduced image quality and, therefore, the number of intra macroblocks may serve as a quality indicator.

In one exemplary embodiment of the invention, the difference of the average QP of all, or a defined subset of, macroblocks of the first picture (102) and the last picture (114) in a GOP can be used to determine the quality difference, as follows. An unweighted arithmetic average can be used to compute the average QP value. However in the same or another embodiment, geometric, weighted arithmetic, or some other type of average calculation can be advantageously used, depending on the application, content characteristics, available computational resources, and other factors.

Referring to FIG. 4, a DeltaQP is calculated (402) by subtracting the average QP (over all macroblocks) of the first picture in the previously coded GOP, from the average QP (over all macroblocks) of the last picture in the previously coded GOP.

By virtue of the ordering of pictures in the GOP and the layer association of those pictures, DeltaQP, therefore, represents a measurement of the quality difference between the latest coded pictures of TL3 and TL0 (the most up-to-date information available on the quality of the base layer and the highest enhancement layer).

Using DeltaQP as a quality indication, the bit allocation is adjusted as follows: if DeltaQP>UpperQPThreshold (403) then TL0 new, TL2 new and TL3 new are set (404) as follows: TL0 new:=TL0 previous−AdjustValue. TL2 new:=TL2 previous+(AdjustValue÷2). TL3 new:=TL3 new+(AdjustValue÷2).

In one exemplary embodiment, AdjustValue is set to 0.05. This value has been experimentally determined to offer a reasonably fast response time to changes in the content, while preserving a desirable stability of bit allocation over time. However, AdjustValue can, advantageously, be adjusted if, for example, the frame rate is higher or lower than in the embodiment, if the GOP length (number of pictures in a GOP) is higher or lower than in the embodiment, or if the content characteristics are known to be different from typical content used in video conferencing.

In the same or another exemplary embodiment, UpperQPThreshold is set to 3. This value has been experimentally determined, and is highly dependent on the video compression algorithm. For example, in video compression according to ITU-T Rec. H.264, and its variants such as SVC, over a broad range of QP values, it is known that the bit rate roughly doubles when the QP is reduced by six QP steps. Other video compression standards or algorithms can have a very different relationship between bit rate changes and QP stepsize changes. The present invention envisions the use of different standards or algorithms in conjunction with the invention, for example, ITU-T Rec. H.264, which would make a change of UpperQPThreshold desirable.

By adding (AdjustValue÷2) to both the allocation of TL2 and TL3, the allocation for both temporal enhancement layers is kept the same. Once more, this has been experimentally determined as advantageous, even considering that, according to the embodiment, TL3 contains twice as many pictures as TL2. Briefly referring to FIG. 3, this allocation can be justified considering that pictures in TL2 (303) can be used for prediction (305) of both other pictures in TL2 (303) and for prediction (308) of pictures in TL3 (306), whereas pictures in TL3 (306) are used only for prediction (309) of other pictures of TL3 (306).

Referring again to FIG. 4, using DeltaQP as a quality indication, the bit allocation is further adjusted as follows: if DeltaQP<LowerQPThreshold (405), then TL0 new, TL2 new and TL3 new are set as follows: TL0 new:=TL0 previous+AdjustValue. TL2 new:=TL2 previous−(AdjustValue÷2). TL3 new:=TL3 previous−(AdjustValue÷2) (406).

In one exemplary embodiment, AdjustValue is set to 0.05, following the same rationale as discussed above.

In the same or another embodiment, LowerQPThreshold is set to 2, following the same rationale as discussed above, and making similar adjustments as discussed above, may be desirable.

By subtracting (AdjustValue÷2) from both the allocation of TL2 and TL3, the allocation to both temporal enhancement layers is kept the same, for reasons discussed above.

This step increases the allocation for TL0 by AdjustValue of the total allocation for all layers, and evenly deducts the allocated bits between TL2 and TL3. Keep in mind that in the exemplary GOP, there are two pictures in TL3 for each picture in TL0 and TL2, which explains the division factor of 2.

Many of the constant values described above can be adjusted, for example, for changes in the layering structure, the use of a different video compression algorithms with different cross-layer prediction techniques, different typical content, different QP-to-rate relationship, and so on. One example is the use of a different layer structure. If there were only a base layer TL0 and a single temporal enhancement layer TL2 with the same number of coded pictures per time interval as TL0, the AdjustValue (i.e., 0.05 in the above example) subtracted from TL0 prev when DeltaQP is greater than UpperQPThreshold (i.e., 3 in the above example) would be assigned in its entirety to TL2.

At this point, the allocation has been changed according to the quality difference of pictures in the base and enhancement layers: However, there is no provision yet to avoid run-away conditions in case of unusual content characteristics or the other factors that de-stabilize the self-tuning properties of the mechanism discussed so far. Those provisions can be exercised for the overall stability of the allocation system and are discussed next.

If TL0 new is>UpperCeiling, (407) then TL0 new is set (408) to UpperCeiling. Further, TL2 new and TL3 new are set (408) to (1−UpperCeiling)÷2 respectively. This upper ceiling for the bit allocation of TL0, and lower threshold for the bit allocation of TL2 and TL3, help to avoid bit starvation for the enhancement layers in the case of, for example, highly active sequences that require a lot of bits for coding the base layer. They also help to avoid excessively large pictures in TL0, which, in a bandwidth-constrained system, may add undesirable delay.

In one exemplary embodiment, UpperCeiling is set to 0.8. This value has been experimentally shown as beneficial for low delay video conferencing environments. The value of UpperCeiling can be varied according to the measured one-way delay of the transport of coded video from the encoder to the decoder, as discussed in the co-pending U.S. provisional patent application filed herewith entitled "Delay Aware Rate Control in the Context of Hierarchical P Picture Coding."

If TL0 new is<LowerBottom (409), then TL0 new is set (410) to LowerBottom, and TL2 new and TL3 new are set to (1−LowerBottom)÷2, respectively. This lower bound has been included since it can be undesirable to spend more bits on any temporal enhancement layer than on a base layer, because the base layer is used for prediction of the enhancement layers and, therefore, advantageously is coded at a higher fidelity than the enhancement layers—which results in higher bit allocation demands.

Both previous steps can be considered fail-safes and are rarely triggered in normal operation, due to the self-regulating mechanism as discussed above.

At this point, the values of TLxprevious are assigned (411) to TLxnew, whereby x is 0, 2, or 3.

This completes the allocation mechanism. It is repeated (412) for subsequent GOPs.

While this disclosure has described several exemplary embodiments, there are alterations, permutations, and various substitute equivalents, which fall within the scope of the disclosed subject matter. It should also be noted that there are many alternative ways of implementing the methods and apparatuses of the disclosed subject matter.

The invention claimed is:

1. A method for allocating bits between one temporal base layer and at least one temporal enhancement layer, comprising
   a) determining a quality difference between at least one picture of the temporal base layer and at least one picture of the at least one temporal enhancement layer, and
   b) determining a new bit allocation for the temporal base layer and the at least one temporal enhancement layer, based on the determined quality difference, wherein the new bit allocation pertains to a plurality of pictures of the layer for the new bit allocation,
   wherein the determining the quality difference comprises subtracting an average Quantizer Parameter (QP) of a set of macroblocks of the at least one picture of the temporal base layer from an average QP of a set of macroblocks of the at least one picture of the at least one temporal enhancement layer,
   wherein, when the quality difference is less than a lower threshold, the determining the new bit allocation comprises adding a first adjustment value of bits to a bit allocation for a plurality of pictures of the base layer and subtracting a second adjustment value of bits from a bit allocation for a plurality of pictures of the at least one enhancement layer, and
   wherein, when the quality difference is greater than an upper threshold, the determining the new bit allocation comprises subtracting a third adjustment value of bits from the bit allocation for the plurality of pictures of the base layer and adding a fourth adjustment value of bits to the bit allocation for the plurality of pictures of the at least one enhancement layer.

2. The method of claim 1, wherein an initial bit allocation between the one temporal base layer and the at least one temporal enhancement layer is determined using constant initialization values.

3. The method of claim 1, wherein the temporal base layer is a non-temporal enhancement layer.

4. The method of claim 3, wherein the temporal base layer is a spatial enhancement layer.

5. The method of claim 3, wherein the temporal base layer is a Signal-to-Noise Ratio (SNR) enhancement layer.

6. The method of claim 1, wherein determining the quality difference further comprises using any one of, or a combination of any of, SNR, Peak Signal-to-Noise Ratio (PSNR), Sum of Absolute Difference (SAD), Sum of Square Errors (SSE).

7. The method of claim 1, wherein determining the quality difference further comprises using the number of intra macroblocks in relation to inter macroblocks.

8. The method of claim 1, wherein the new bit allocation includes the limitation to a minimum and/or a maximum bit allocation for a layer.

9. The method of claim 1, wherein the first adjustment value comprises a constant percentage of bits.

10. The method of claim 1, wherein the third adjustment value comprises a constant percentage of bits.

11. The method of claim 1, wherein the second adjustment value comprises a constant percentage of bits.

12. The method of claim 1, wherein the fourth adjustment value comprises a constant percentage of bits.

13. A digital video system for allocating bits between one temporal base layer and at least one temporal enhancement layer, comprising:
   (a) an encoder for creating the temporal base layer and the at least one temporal enhancement layer;
   (b) at least one decoder configured to decode the temporal base layer and the at least one temporal enhancement layer;
   (c) a bit allocation mechanism for determining how to allocate bits by:
      i) determining a quality difference between at least one picture of the temporal base layer and at least one picture of the at least one temporal enhancement layer, and
      ii) determining a new bit allocation for the temporal base layer and the at least one temporal enhancement layer, based on the determined quality difference, wherein the new bit allocation pertains to a plurality of pictures of the layer for the new bit allocation,
      wherein the determining the quality difference comprises subtracting an average Quantizer Parameter (QP) of a set of macroblocks of the at least one picture of the temporal base layer from an average QP of a set of macroblocks of the at least one picture of the at least one temporal enhancement layer,
   wherein, when the quality difference is less than a lower threshold, the determining the new bit allocation comprises adding a first adjustment value of bits to a bit allocation for a plurality of pictures of the base layer and subtracting a second adjustment value of bits from a bit allocation for plurality of pictures of the at least one enhancement layer, and
   wherein, when the quality difference is greater than an upper threshold, the determining the new bit allocation comprises subtracting a third adjustment value of bits from the bit allocation for the plurality of pictures of the base layer and adding a fourth adjustment value of bits to the bit allocation for the plurality of pictures of the at least one enhancement layer; and
   (d) a mechanism to transmit the temporal base layer and the at least one temporal enhancement layer.

14. The digital video system of claim 13, wherein said digital video system further comprises at least one storage medium for storing said temporal base layer and at least one temporal enhancement layer.

15. The digital video system of claim 13, wherein said video encoder comprises at least a portion of a distributed server.

16. The digital video system of claim 13, wherein said video decoder comprises at least a portion of a distributed server.

17. A non-transitory computer readable medium comprising a set of instructions to direct a processor to perform the method of claim 1.

18. A non-transitory computer readable medium comprising a set of instructions to direct a processor to perform the method of claim 2.

19. A non-transitory computer readable medium comprising a set of instructions to direct a processor to perform the method of claim 3.

20. A non-transitory computer readable medium comprising a set of instructions to direct a processor to perform the method of claim 4.

21. A non-transitory computer readable medium comprising a set of instructions to direct a processor to perform the method of claim 5.

22. A non-transitory computer readable medium comprising a set of instructions to direct a processor to perform the method of claim 6.

23. A non-transitory computer readable medium comprising a set of instructions to direct a processor to perform the method of claim 7.

24. A non-transitory computer readable medium comprising a set of instructions to direct a processor to perform the method of claim 8.

25. A non-transitory computer readable medium comprising a set of instructions to direct a processor to perform the method of claim 9.

26. A non-transitory computer readable medium comprising a set of instructions to direct a processor to perform the method of claim 10.

27. A non-transitory computer readable medium comprising a set of instructions to direct a processor to perform the method of claim 11.

28. A non-transitory computer readable medium comprising a set of instructions to direct a processor to perform the method of claim 12.

\* \* \* \* \*